United States Patent Office 3,479,308
Patented Nov. 18, 1969

3,479,308
ANTIFOGGING FILM COMPRISING VINYL
CHLORIDE POLYMER AND FATTY ACID
ESTERS
Miles N. Gattenby, Jr., Lowell, and Anthony S. D'Amato, Chelmsford, Mass., assignors to The Borden Company, New York, N.Y., a corporation of New Jersey
No Drawing. Filed Dec. 11, 1964, Ser. No. 417,776
Int. Cl. C08f 29/18, 45/58, 47/14
U.S. Cl. 260—23                                    13 Claims

ABSTRACT OF THE DISCLOSURE

This invention relates to polymerized polymeric vinyl films containing a minor proportion of an antifogging and antitackifying agent, said agent being a combination of a partial ester of a water soluble $C_{2-6}$ polyol with a $C_{12-18}$ aliphatic monocarboxylic acid and a polyalkoxylated derivative of a partial ester of a water-soluble $C_{2-6}$ polyol and a $C_{12-18}$ aliphatic monocarboxylic acid the alkoxy groups therein having each 2–3 carbon atoms and the number of alkoxy groups being about 3–30 per molecule of said alkoxylated partial ester.

---

Polymer films or sheets are widely used to package food products because of their ease of handling, inherent viewability and elimination of the sanitary problem. Some examples of such films include cellophane, rubber hydrochloride, polypropylene, polyethylene, polyvinyl chloride and various interpolymers and mixtures of polymers of vinyl halides, acetates, alcohols and acrylates. When polymeric films are used to package food products, and particularly fresh meat products, and the packages are subsequently stored for display in refrigerated units, certain disadvantages become evident. Within temperature ranges normally found in such refrigeration units, about 25° F.–40° C., the depressed vapor pressure of water results in precipitation of fine droplets of moisture on the surfaces of the film. The resulting droplets remain substantially in a non-coalesced state and thus gives the appearance of layer of fog above the food product which the film protects. The term "fog" is in fact commonly used to describe this occurrence. The presence of fog is particularly objectionable from the point of view of selling the products as it effectively bars the potential customer's view of the item which he seeks to purchase. It is an additional requirement of the wrapper film that when the food on display is a red meat item such as beef, that it be sufficiently permeable to oxygen as to allow oxidation of the hemoglobins in the blood of fresh red meat in order to have the meat retain its red surface color. The red color is usually required to last up to three days at refrigeration temperatures. Insufficient oxygen permeability results in a rapid and undesirable darkening of the meat.

The oxygen permeability rate through a polymeric vinyl film will be enhanced by an increase in the amount of plasticizer added to the resin. Generally, for food articles which do not require the high oxygen permeability rate desired when red meats are packaged in polymeric films, plasticizer concentrations in the order of about 25% by weight of the polymeric resin are deemed acceptable. Increasing the oxygen permeability rate by increasing the quantity of plasticizer in the polymer composition, however, results in a blocky film. Blocky is a characteristic of polymeric films which defines its tackiness or stickiness. When a film which has relatively high blocking is rolled onto a spool, adjacent layers of film adhere thereby rendering the spool useless.

The present invention provides polymeric vinyl film or sheet which is non-fogging, has antiblocking properties, and has increased oxygen permeability at the refrigeration temperatures and humidities to which such films are exposed during use.

Briefly stated, the present invention is a polymeric composition and film or sheet made therefrom comprising plasticized polymeric vinyl material and an antifogging and antitackifying agent. Other components may be included such as stabilizers, color additives and materials well known in this art.

The antifogging and antitackifying agent is a partial ester of water soluble polyols and aliphatic monocarboxylic acids (referred to as partial ester 1) and polyalkoxylated derivatives of a partial ester of water soluble polyols and aliphatic monocarboxylic acids (referred to as partial ester 2).

Partial ester 1 is a partial (such as mono-ester) of a water soluble $C_{2-6}$ polyol which polyol contains at least two alcohol groups. A minimum of one of such alcohol groups are not reacted with acid to form the ester and at least one of such alcohol groups are reacted with acid to form the ester. The polyol component of this partial ester may be glycerol; ethylene, propylene or other $C_{2-4}$ glycols; trimethylol propane; sorbitol; and the like. The acid component may be any $C_{12-18}$ aliphatic monocarboxylic acid, examples of which are lauric, palmitic, oleic, stearic and like acids.

Partial ester 2 is a polyalkoxylated derivative of a partial ester of a water soluble $C_{2-6}$ polyol which polyol contains at least two alcohol groups. A minimum of one of such alcohol groups are not reacted with acid to form the ester, and at least one of such alcohol groups are reacted with acid to form the ester. The polyol component of this partial ester may be glycerol; ethylene; propylene or other $C_{2-4}$ glycols; trimethylol propane; sorbitol; sorbitan and the like. The acid component may be a $C_{12-18}$ aliphatic monocarboxylic acid, examples of which are lauric, palmitic, oleic, stearic and like acids. The alkoxylated groups of said partial ester 2 each have between about 2–3 carbon atoms, per repeating alkoxy unit. The number of alkoxylated groups may be between about 3–30 per molecule of the alkoxylated partial ester. Illustrative examples are polyoxyethylene sorbitan monooleate, polyoxypropylene propylene glycol monooleate, polyoxybutylene trimethylol propane monooleate and the corresponding stearates, laurates, palmitates, etc., said partial esters having 5–25 alkoxylated groups to the molecule are usually preferred. The best results are generally obtained with polyoxyethylene sorbitan monooleate having about 20 oxyethylene groups to the molecule.

We have found that in order to impart antifogging properties to a vinyl film, both partial esters must be present in the composition. From the point of view of strictly antifogging properties in the film, we have found that 2 parts (about) by weight of each ester for 100 parts of polymeric vinyl resin will result in good non-fogging properties in a film or sheet made from said resin. However, when relatively high proportions of common plasticizers are included in the film formulation in order to obtain greater gas diffusion through the film, we prefer to have excess of 2 parts and about at least 3 parts of partial ester 1 added to the film formulation in order to maintain the high level of antiblocking properties of the film.

The polymeric vinyl material used in the present invention includes polyvinyl chloride, polyvinyl acetate and copolymers and mixtures of homopolymers thereof. Examples of other copolymers that may be used are those of vinyl chloride with $C_{1-8}$ alkyl esters of alpha-unsaturated aliphatic acids having 3–5 carbon atoms to the molecule of said acid. Examples of these alkyl esters include methyl, ethyl and octyl acrylate and methacrylate. The homopolymer, polyvinyl chloride and copolymers and mixtures of homopolymers wherein the vinyl chloride moiety is present in major proportions gives satisfactory films for wrapping meats or the like.

We have found that a plasticized polymeric vinyl film which includes our antifogging and antitackifying agent, said plasticizer being present in the proportion of between about 20 to 60 parts by weight per 100 parts of vinyl polymer resin, will result in a film or sheet having the desired properties.

The partial ester which make up the antifogging and antitackifying agents of the present invention are used in the proportion of about 1–15 parts of partial ester 1, and at least about 3 parts when antiblocking is desired, and about .5–10 parts of partial esters 2 in each case for 100 parts of the polymeric vinyl resin. We ordinarily use about 3–10 parts of partial ester 1 and about 1–5 parts of partial ester 2, the total being at least 4 parts when 40 or more parts of plasticizer are used. More than 15 parts and 10 parts respectively, are uneconomical and unnecessary.

The balance of the formulation may include a conventional plasticizer for polyvinyl chloride, i.e., substantially nonvolatile solvents that are chemically inert to the resin, as, for example, di(2-ethylhexyl)adipate, acetyl tributylcitrate, epoxidized soybean oil, butyl phthalyl butyl glycolate, diisobutyl adipate, diphenyl (2-ethylhexyl) phosphate, butyl benzyl phthalate, and the like and mixtures thereof. The total plasticizer concentration in the vinyl film should generally be between about 20–60 parts by weight of plasticizer for 100 parts by weight of vinyl film and preferably between about 30–50 parts.

Other additives to the film composition may include usual stabilizers for polyvinyl chloride films such as for example triphenyl phosphate, nonylphenol, barium, cadmium, calcium and zinc salts of lauric and other fatty acids, and mixtures thereof.

There may also be included approved food colors to establish the color desired.

Generally, the polymeric vinyl resin, plasticizer and antifogging and antitackifying agent are heated and/or subjected to high shear and thus blended. Other additives, such as stabilizers and color modifiers may be added to the blend. When heat is used in blending, the temperature is such that it is sufficient to provide adequate penetration of the plasticizer and said agent into the vinyl resin. The solution is then extruded, drawn, blown or in any other convenient manner made into a film or sheet. The thickness of the film or sheet can be varied as desired however, we have found that a useful thickness for red meat films is between about .1 mil and 2 mils. Thicknesses greater than 2 mils may require additional plasticizer to attain the desired gas permeability rates.

The following table shows proportions of ingredients of the several classes as illustrative of proportions which can be used in the present invention and also those recommended for commercial use. It is understood that the ranges given in the Table are by way of example and not by way of limitation. The purpose of the Table is to offer constructive assistance in formulating the desired filming form composition. Proportions here and elsewhere herein are expressed as parts by weight on a dry basis unless specifically stated to the contrary.

| Components | Parts by Weight | |
|---|---|---|
| | Illustrative | Recommended |
| Polyvinyl chloride resin | 100 | 100 |
| Partial ester 1* | 1–15 | 3–10 |
| Partial ester 2* | .5–10 | 1–5 |
| Plasticizer | 20–60 | 30–50 |

Total: At least 4 parts when 40 or more parts of plasticizer are used.

The invention is further illustrated by description in connection with the following specific examples of the practice of it.

EXAMPLE 1

A mixture for a polyvinyl chloride film was prepared in the following proportions:

| Film components: | Parts by weight |
|---|---|
| Polyvinyl chloride | 100 |
| Di(2-ethylhexyl) adipate | 20 |
| Acetyl tri-n-butyl citrate | 15 |
| Epoxidized soybean oil | 10 |
| Glycerol monooleate | 6 |
| Polyoxyethylene (20) [1] sorbitan monooleate | 2 |
| Cadmium and zinc laurate stabilizer (1 Cd: 1 Zn) | 2 |

[1] Contains 20 $C_2H_4O$ groups per molecule.

The composition was warmed and blended at about 225° F. until the mass was substantially uniform. The heated compound was conveyed to an extruder and made into a film or sheet approximately ¾ mil thick. The film had excellent antitackifying, antifogging and gas diffusion properties.

EXAMPLE 2

The procedure and composition of Example 1 are used except that the polyvinyl chloride resin is replaced by 100 parts of a copolymer of 90% vinyl chloride and 10% vinyl acetate. Film thickness is approximately .2 mil.

EXAMPLE 3

The procedure and composition of Example 1 are used except that glycerol monooleate is replaced by 9 parts of ethylene glycol monolaurate and the film is blown to a thickness of approximately 2 mils.

EXAMPLE 4

The procedure and composition of Example 1 are used except that the polyoxyethylene (20) sorbitan monooleate is replaced by 4 parts of polyoxyethylene (20) sorbitan monopalmitate.

EXAMPLE 5

The procedure and composition of Example 1 are used except that the polyvinyl chloride is replaced by 100 parts of a mixture of 90 parts of polyvinyl chloride and 10 parts of polyvinylacetate.

EXAMPLE 6

The procedure and composition of Example 1 are used except that the polyvinyl chloride is replaced by 90 parts of polyvinyl chloride and 10 parts of a copolymer of 50% vinyl chloride and 50% methyl methacrylate.

Examples 2 to 6 have the antifogging, antitackifying and gas diffusion properties of the compound of Example 1.

Representative films (about ¾ mil) made from the composition of the examples were used to wrap consecutively cut slices of rumpsteak and the results compared with control specimens wrapped in films of cellophane and in rubber hydrochloride film, all being tested for 24, 48 and 72 hours at 32° F. All samples remained red for 3 days showing that the films of this invention have oxygen permeability characteristics at least equal to that of films heretofore thought to be best for this purpose. Note was also taken of the lack of fog on the films of the present invention whereas fog was present on other films in these tests. Additionally, the films of the present invention had good antiblocking properties at this high level of plasticizer. Polyvinyl chloride films (of equal thickness) without the antifogging and antitackifying agent of this invention but containing up to 35 parts of conventional plasticizer do not keep the meat red for the full 3 days at reduced temperatures. Attempts to make a conventional polyvinyl chloride film containing over 40 parts of conventional plasticizer result in blocked films which are unusable. Further the conventional polyvinyl chloride film has inadequate antifogging properties under these conditions.

The antifogging property of the films is measured quantitatively by covering a glass which contained distilled water with a sample of film and holding the glass at 32° F. The antifogging property is measured by the time required for the water condensate that develops on the film surface to coalesce into a clear continuous layer. Antiblocking properties are measured qualitatively by observation and feel of the film.

EXAMPLE 7

The procedure and composition of Example 1 are used except that the glycerol monooleate and the polyoxyethylene (20) sorbitan monooleate are replaced separately and in turn with the disclosed partial esters 1 and partial esters 2 and in the quantities disclosed.

Example 7 has antifogging, antitackifying and gas diffusion properties.

It will be understood that it is intended to cover all changes and modifications of the examples of the invention herein chosen for the purpose of illustration which do not constitute departures from the spirit and scope of the invention.

We claim:
1. A film comprising in major proportions a vinyl resin selected from the group consisting of polyvinyl chloride, polyvinyl acetate, mixtures of polyvinyl chloride and polyvinyl acetate containing major proportions of polyvinyl chloride, and copolymers of vinyl chloride with a comonomer selected from the group consiting of vinyl acetate and $C_{1-8}$ alkyl esters of alphaunsaturated aliphatic acids having 3–5 carbon atoms per molecule containing major proportions of vinyl chloride, a subtantially non-volatile, plasticizer component for the resin, and in minor proportions an antifogging and anti-tackifying agent, said agent being the combination of (1) a partial ester of a water soluble $C_{2-6}$ polyol with an aliphatic monocarboxylic acid and (2) a polyalkoxylated derivative of a partial ester of a water-soluble $C_{2-6}$ polyol and an aliphatic monocarboxylic acid the alkoxy groups therein having each 2–3 carbon atoms and the number of alkoxy groups being about 3–30 per molecule of said alkoxylated partial ester, the proportion of plasticizer being from about 20 to about 60 parts by weight for each 100 parts of polymeric vinyl material and the total of partial esters being at least 4 parts by weight when 40 or more parts of plasticizer are used.

2. The film of claim 1 wherein said vinyl resin is polyvinyl chloride.

3. The film of claim 1 wherein said vinyl resin is the copolymer of vinyl chloride in major proportions with a comonomer selected from the group consisting of vinyl acetate and $C_{1-8}$ alkyl esters of alpha-unsaturated aliphatic acids having 3–5 carbon atoms per molecule.

4. The film of claim 2, said partial esters being mono esters.

5. The film of claim 3, said partial esters being mono esters.

6. The film of claim 2, said acid being a $C_{12-18}$ acid.
7. The film of claim 3, said acid being a $C_{12-18}$ acid.
8. The film of claim 2, said alkoxy groups being ethoxy.
9. The film of claim 3, said alkoxy groups being ethoxy.
10. The film of claim 1, the proportion of the first mentioned partial ester being between about 3–15 parts by weight and of said polyalkoxylated derivative about .5–10 parts by weight for 100 parts of the plasticized polymeric vinyl material.
11. A film comprising the following materials in approximately the proportions shown: 100 parts of polyvinyl chloride, 1–15 parts of glycerol monooleate, 0.5–10 parts of polyoxyethylene (20) sorbitan monooleate and a substantially non-volatile plasticizer component for the resin, the total of the glycerol monooleate and said monooleate being at least 4 parts, the proportion of said plasticizer being at least 40 parts.
12. The film of claim 11, said plasticizer being selected from the group consisting of di-(2 ethylhexyl) adipate, acetyl tributyl citrate, epoxidized soybean oil, butyl phthalyl butyl glycolate, diisobutyl adipate, diphenyl (2-ethylhexyl) phosphate and butyl benzyl phthalate.
13. A plasticized red meat packaging film for keeping said meat red under refrigeration conditions and which film thickness is between about .1 mil and 2 mills said film having good gas diffusion characteristics, antifogging properties and antiblocking properties comprising the following materials in approximately the proportions shown: 100 parts of polyvinyl chloride, 3–10 parts of glycerol monooleate, 1–5 parts of polyoxyethylene (20) sorbitan monooleate and 40–60 parts of a substantially non-volatile plasticizer component for the resin, the total of the glycerol monooleate and said monooleate being at least 4 parts.

References Cited

UNITED STATES PATENTS

| 2,676,943 | 4/1954 | Carson | 260—31.8 |
| 3,048,263 | 8/1962 | Sacks et al. | 206—45.33 |
| 3,057,810 | 10/1962 | Guillet et al. | 260—23 |
| 3,156,663 | 11/1964 | Gordon et al. | 260—31.6 |
| 3,222,210 | 12/1965 | Hammond | 117—68 |
| 3,303,049 | 2/1967 | Hill | 117—138.8 |
| 3,355,313 | 11/1967 | Eastes | 117—47 |

OTHER REFERENCES

Becher: "Emulsions: Theory and Practice," 1957, pp. 180 and 182.

DONALD E. CZAJA, Primary Examiner

R. A. WHITE, Assistant Examiner

U.S. Cl. X.R.

99—174; 260—31.4, 31.6, 31.8